United States Patent [19]

Haraikawa

[11] 3,795,111

[45] Mar. 5, 1974

[54] TANDEM MASTER CYLINDER

[75] Inventor: Tetsuo Haraikawa, Funabashi, Japan

[73] Assignee: Tokico Ltd., Kawasaki-shi, Kanagawa-ken, Japan

[22] Filed: Sept. 29, 1972

[21] Appl. No.: 293,740

[30] Foreign Application Priority Data
Sept. 29, 1971  Japan.............................. 46-76366

[52] U.S. Cl..................................... 60/581, 60/589
[51] Int. Cl............................................. F15b 7/08
[58] Field of Search ..... 60/54.5 E, 54.6 E, 589, 581

[56] References Cited
UNITED STATES PATENTS

| | | | |
|---|---|---|---|
| 3,473,634 | 10/1969 | Strifler et al. | 60/54.5 E |
| 3,701,257 | 10/1972 | Gaiser | 60/54.6 E |
| 3,486,337 | 12/1969 | Tenniswood | 60/54.6 E |
| 3,262,273 | 7/1966 | Harvey | 60/54.6 E |
| 3,488,959 | 1/1970 | Tenniswood | 60/54.6 E |

Primary Examiner—Edgar W. Geoghegan
Assistant Examiner—A. M. Zupcic
Attorney, Agent, or Firm—Sughrue, Rothwell, Mion, Zinn & Macpeak

[57] ABSTRACT

This invention relates to a tandem master cylinder adapted for use in the hydraulic braking system of a powered and wheeled vehicle.

More specifically, the invention concerns with such master cylinder assembly having a stepped bore cylinder and a corresponding stepped hydraulic piston slidably arranged therein. This type piston is provided with a valve acting member, preferably an elongated valve rod for actuation of at least the foremost valve mechanism so as to interrupt the normally established hydraulic communication between a related liquid reservoir and a related hydraulic chamber. In the conventional master cylinder, this valve rod is made rigidly with the main piston which causes a substantially elongated axial length of the cylinder assembly. According to the present invention, said valve rod is arranged to move telescopically relative to the main piston, so as shorten the axial length of the cylinder.

1 Claim, 2 Drawing Figures

PATENTED MAR 5 1974       3,795,111

TANDEM MASTER CYLINDER

This invention relates to a tandem master cylinder adapted for use in the hydraulic braking system of a powered and wheeled vehicle.

Such tandem master cylinder as having a piston by which the interior space of the cylinder is divided into two or more hydraulic chambers from which hydraulic pressure liquid can be taken out separately for the wheel braking purpose, is well known per se. According to a representative design of this kind of master cylinder, it is provided with two separate pistons one of which is constituted as a free piston, thereby two separated hydraulic chambers being formed at the both sides of the free piston. By the advancing movement of the other or main piston, substantially same hydraulic pressures are generated separately in these chambers. Besides this free piston type master cylinder, the stepped piston type one is known wherein the piston is arranged slidable in a correspondingly stepped bore of the cylinder. By movement of the rigid stepped piston to-and-fro, respective valves, cooperating respectively with the stepped piston parts, are automatically operated so as to generate hydraulic pressure in the respective cylinder chambers.

It is highly difficult to generate, however, different hydraulic pressures in the cylinder chambers, when so desired, in the case of the free piston type master cylinder. In addition, when it is desired to use an elongated piston stroke in this case, the hydraulic outlet socket for the cylinder chamber defined by the free piston must be provided at the forward end of the cylinder. Substantial limitation in the arrangement of the related other parts must be disadvantageously encountered by employment of this kind of outlet socket design.

In the case of the latter or stepped piston type, only the working parts of the piston are utilized for on-off control of the respective valves of the above kind provided on the cylinder, thus the rear or root portion of the piston being left idle in the valve operating service. As a general rule, an additional cylinder element of the tight design must be provided at the forward end of the main cylinder so as to cooperate with the forward end of the piston and for on-off control of the forwardly provided one of the valves. It is thus required generally to adopt a substantially elongated cylinder assembly added generally with an axial length which corresponds substantially to a stroke length of the piston relative to the main cylinder. For this purpose, a substantial space must be consumed for the arrangement of this kind of lengthy cylinder assembly. Especially, when the cylinder assembly is arranged to cooperate with a vacuum servomechanism, the mounting procedures of the former in the manufacture and attachment thereof in the hydraulic braking system for the automotive vehicle are highly complicated and troublesome, thus representing a substantial drawback in the art.

The general object of the present invention is to provide an improved tandem master cylinder employing a stepped piston which assembly, however, represents a highly simplified design of a substantially shortened axial length and is constituted by a smaller number of constituent parts.

A specific and main object of the invention is to provide a stepped piston type master cylinder wherein, upon failure of generation of the hydraulic pressure in one of the two hydraulic chambers in the cylinder, the piston must not move substantially its whole stroke length.

A further specific and subsidiary object of the present invention is to provide a master cylinder of the above kind wherein, should hydraulic pressure fail to generate in one of the two hydraulic chambers, an increased hydraulic pressure relative to the regular or otherwise appearing valve can be generated in the remaining or effective hydraulic chamber.

A still further specific and subsidiary object of the present invention is to provide a master cylinder of the above kind which as a substantially shortened cylinder length by virtue of a specifically designed valve stem operative in the piston.

These and further objects, features and advantages of the invention will become more apparent when read the following detailed description of the invention by reference to the accompanying drawing illustrative of a preferred embodiment of the invention.

Figures 1, 2:
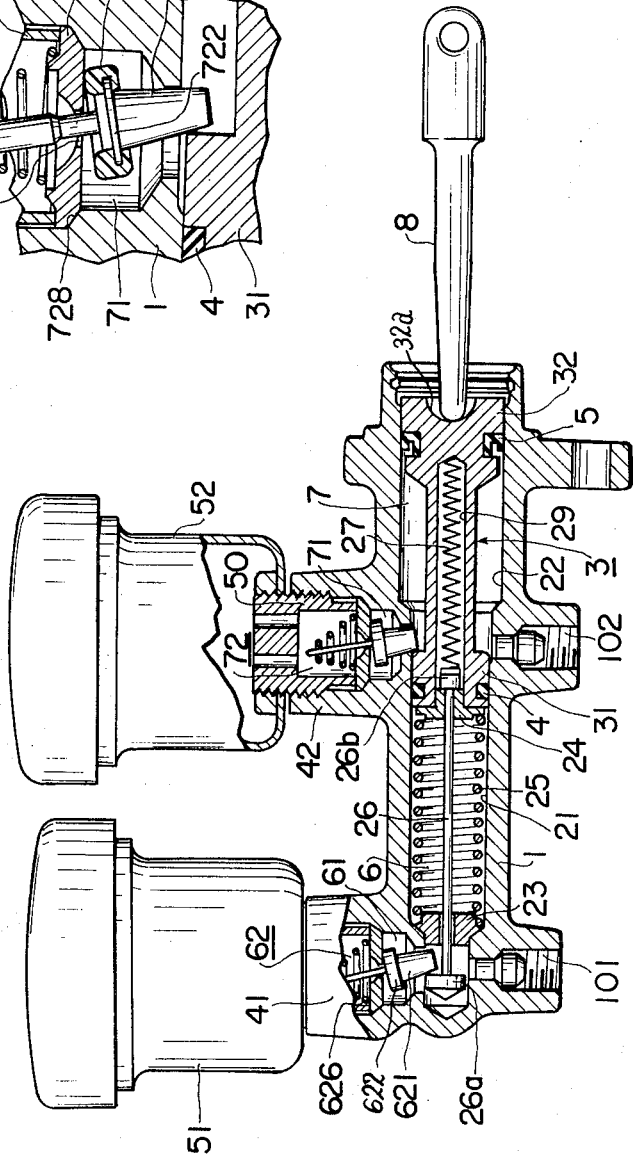
FIG. 1 is a partially sectioned and broken-away side view of the master cylinder according to the present invention.
FIG. 2 is an enlarged sectional elevation of a valve mechanism employed in the foregoing master cylinder.

Referring now to the accompanying drawing, numeral 1 represents a cylinder which is formed a smaller diameter axial bore 21 and a larger diameter axial bore 22 kept in communication with each other as shown. A stepped piston generally shown at 3, comprising a smaller diameter piston part 31 and a larger diameter part 32 which are arranged to cooperate with said smaller and larger bores 21 and 22, respectively, said piston parts being made rigid with each other. Numerals 4 and 5 represent sealing means mounted on the said smaller and larger piston parts. Numerals 6 and 7 represents smaller and larger diameter cylinder chambers formed in the inner cylinder space corresponding to the said smaller and larger diameter cylinder bores as shown. By the provision of these sealing means 4 and 5, these cylinder chambers are kept hydraulically independent from each other.

The outer end of the larger piston part 32a is formed with a reception recess 32a and exposed to outside atmosphere, a pusher rod 8 being kept at its inner end in pressure engagement with said recess 32a, while the outer end is lined with a foot-operated brake pedal, not shown. When the driver depresses the pedal, axial urging force is transmitted therefrom through the pusher rod to the piston 3 which is thus urged to move axially and inwardly.

At the both ends of the forward smaller diameter hydraulic chamber 6, there are two spring retainers 23 and 24 of which that denoted 23 is positioned stationary, while that denoted 24 is attached to the outer end of the smaller piston part 31. A return coil spring 25 is provided under compression between these retainers 23 and 24, thereby the piston 3 being resiliently urged to move in the rightward direction in FIG. 1.

The piston 3 is formed with an axial blind bore 29 containing an elongated coil spring 27. A valve rod 26 slidably passes through the retainers 23 and 24, the inner end of said rod extending telescopically into said blind bore 29 and kept by its inner enlarged end 26b in pressure contact with the inner end of coil spring 27. Valve rod 26 is formed at its outer end with an enlarged part 26a. The inner enlarged rod end 26b is kept in pressure contact with the right-hand side of inner retainer 24.

Since the spring 27 has a substantially weak spring force relative to that of the return spring 25, piston 3 and valve rod 26 are normally arranged as shown in FIG. 1.

A first cylindrical upright and hollow projection 41 is formed integral with the main cylinder 1 in proximity to said enlarged rod end 26a. A similar second upright hollow projection 42 is formed integral with the main cylinder in proximity to the smaller piston part 31. These hollow projections 41 and 42 are formed respectively with passages 61 and 71 which are kept in hydraulic communication with chambers 6 and 7, respectively and provided with respective valve mechanisms 62 and 72. Referring to the right-hand valve mechanism 72, the latter is kept in position by means of a sleeve 50 which is threaded into the threaded upper part of said passage 71. To this sleeve 51, a liquid reservoir vessel 52 is fixedly attached as shown. The second or forward hollow projection 41 of the similar design and provided with similar valve mechanism and a similar reservoir vessel 51 as mentioned above.

In FIG. 2, detailed structure of the first valve mechanism 72 is more specifically shown.

The passage 71 of the cylindrical projection 71 is formed with at least an inside circular shoulder 728 on which a disc plate 724 is mounted, said disc plate being centrally perforated at 725. The sleeve 50 extends downwardly and the lowermost end of the sleeve is kept in pressure engagement with the upper surface of the disc plate, thereby the latter being positioned fixedly on the shoulder 728. The valve member comprises a lower engageable projection 721, an intermediate flange 722 made integral therewith and an upwardly extending stem 727 which passes with ample plays through said central perforation 728. A spiral coil spring 726 surrounds the stem 727, the upper end of said spring being fixedly attached to the upper part of said stem by means of stot, pin or the like conventional attaching means and the lower end part of said spring being in kept pressure contact with the upper surface of disc plate 724. A resilient ring 723 is fixedly attached to the periphery of said flange 722. By virtue of the above structure of the valve mechanism 72, the resilient ring 723 is urged under the action of spring 726 to be kept in pressure contact with the lower surface of said disc plate 724. Thus, the valve mechanism 72 operates normally to interrupt fluid communication between the related reservoir vessel 52 and hydraulic chamber 7.

The second valve mechanism 62 has the similar structure as above. Members 621, 622 and 626 correspond to 721, 722 and 726, respectively.

The respective off-service positions of these valve mechanisms 62 and 72 are as shown in FIGS. 1 and 2 and more specifically as follows:

With the pusher rod 8 is kept in its regular or off-service position as shown, the piston 3 is also kept at its regular or right-hand extreme position. The valve rod 26 is kept at its most extended position under the action of spring 27. Under these conditions, the respective engageable projections 621 and 721 of the valve mechanisms 62 and 72 are kept in contact with the enlarged rod end 26a and the inner shoulder end of the smaller piston part 31, respectively, thereby the respective valve members being kept in their inclined position against the action of respective spiral coil springs 626 and 726, as representatively shown in FIG. 2.

Under off-service position of the brake system, the reservoir vessels 51 and 52 are kept in fluid communication with respective hydraulic chambers 6 and 7, thus no hydraulic pressure being generated or accumulated in these chambers.

When the brake pedal is depressed, pusher rod 8 is moved leftwards in FIG. 1, the piston 3 is urged mechanically to move axially in the same direction. With this movement of the piston, the smaller piston part 31 is separated from contact with the engageable projection 721 of the first valve mechanism 72, thus the resilient ring 723 being brought into tight contact with the lower surface of the disc plate 724 and the hitherto established fluid communication between the reservoir vessel 51 and the pressure chamber 6 being positively interrupted.

Then, the second valve mechanism 62 is also actuated by the separation of rod end 26a from the engageable projection 621.

With further leftward and forward movement of the piston 3, hydraulic pressures are generated and accumulated in the respective pressure chambers 6 and 7 and delivered therefrom through respective outlet sockets 101 and 102, respectively, thence through respective brake pipings and wheel brake cylinders, not shown.

With the aforementioned forward movement of the piston 3, valve rod 26 acts at first upon the valve mechanism 62, but, substantially instantly thereupon, the enlarged rod end 26a is brought into collision against the front end wall of the cylinder 1 and prevented from its further movement.

With further advancing movement of piston 3, the right-hand or inner end of valve rod 26 will telescopically invade into the blind bore 29 against the action of spring 27. Upon release of the foot pressure from the brake pedal, all the movable constituents are returned to their original position shown in FIG. 1.

In the conventional comparative master cylinder, a valve actuating member corresponding to the valve rod 26 adapted for actuation of the forward or second valve mechanism is made integral with the stepped main piston and thus, it must continue its forward movement together with the main piston, even upon the execution of valve-closing operation for the forward or second valve mechanism for interruption of the fluid communication between the related liquid reservoir and the related cylinder chamber. This further advancing movement of the valve operating member will necessarily bring out a correspondingly increased occupying space by the master cylinder assembly. By adopting the aforementioned telescopic arrangement of the valve operating member relative to the main piston, such additional and excess movement of the said member can be dispensed with, thereby a substantial decrease in the axial length of the master cylinder assembly being realized with equal operating efficiency thereof.

Although in the embodiment shown and described in the foregoing, the outlet socket 101 has been arranged to direct in the perpendicular direction to the axis of the master cylinder assembly, it may be modified so as to direct axially as in the case of the free piston type master cylinder by slightly modifying the rod end 26a and the forward end wall of the main cylinder 1.

In the foregoing embodiment, the number of the hydraulic cylinder chambers was only two, but in practice, the principles of the present invention could be well applied to such modified master cylinder assembly as having more than two cylinder chambers, although such modification has been omitted from the specification and drawing by virtue of its very obviousness over the foregoing sole representative embodiment of the present invention.

The embodiments of the invention in which an exclusive property or privilege is claimed are as follows:

1. A master cylinder assembly comprising a cylinder having a stepped axial bore, a correspondingly stepped onepiece piston slidably arranged in said bore to define at least two mutually hydraulically independent chambers in said bore, reservoir means, passage means connecting said reservoir means with each of said chambers, a tilting valve mechanism disposed in each of said passage means and having an operating portion thereon extending into each of said chambers, shoulder means on said stepped piston in one of said chambers for operatively tilting one of said valve mechanisms to the open position when said piston is disposed in the off service position, fixed abutment means on said cylinder in the other of said chambers, return spring means interposed directly between said fixed abutment means and said piston, a counter bore in the end of said piston in the other of said chambers, an axially extending valve control member slidably disposed in said counter bore and telescopically movable relative to said piston, stop means for retaining one end of said member in said counter bore, spring means disposed in said counter bore urging said valve control member into engagement with said stop means, and valve operating means on the other end of said valve control member for operatively tilting the other of said valve mechanisms to the open position when said piston is disposed in the off service position.

* * * * *